United States Patent Office 3,083,214
Patented Mar. 26, 1963

3,083,214
TRIARYLCARBINOLS
Carl Serres, Jr., Whiting, Ind., and Ellis K. Fields, Chicago, Ill., assignors to Standard Oil Company, Chicago, Ill., a corporation of Indiana
No Drawing. Filed Sept. 14, 1959, Ser. No. 839,548
4 Claims. (Cl. 260—389)

This invention relates to a process for preparing triarylcarbinols.

In the prior art, it is known that triarylcarbinols can be obtained by oxidation of triarylmethanes with chemical oxidizing agents. For example, triphenylcarbinol has been prepared by nitric acid oxidation of triphenylmethane (Schmidlin et al., Ber. Deutsch Chem. Ges. 45, 3190) and by oxidation with chromic anhydride in acetic acid (E. Fischer et al., Ann. 1878, 194, p. 27). Alternative processes for the synthesis of triarylcarbinols are likewise known, for example, by the Grignard reaction of phenyl magnesium bromide with diethylcarbonate or carbon dioxide or other techniques which are described in Elsevier's "Chemistry of Carbon Compounds," vol. III, p. 1084 et seq.

These processes are expensive, and when chemical oxidants such as nitric acid are employed, the products contain nitro compounds as difficultly removable impurities because of the relative ease of nitration of aromatic rings.

The object of this invention is to produce triarylcarbinols in high yield by an economical method. This is accomplished by subjecting triarylmethanes to catalytic oxidation in the liquid phase with molecular oxygen containing gas in the presence of an oxidation catalyst comprising in conjoint presence bromine and a heavy metal oxidation catalyst.

The triarylmethanes which are oxidized in accordance with the process of the present invention have the general formula $(Ar)_3CH$ wherein Ar is a monovalent aryl radical, preferably phenyl or naphthyl. The aryl radical may carry one or more alkyl radicals containing 1 to 4 carbon atoms, and may have one or more other nuclear substituents such as chloro, alkoxy, nitro groups which are inert to oxidation. Where alkyl groups are present as substituents, they are converted to the corresponding carboxy groups during the oxidation of the triarylmethane to the corresponding triarylcarbinol.

Typical triarylmethane compounds which can be converted to triarylcarbinols include, for example triphenylmethane, trinaphthylmethane, monomethyltriphenylmethane, dimethyltriphenylmethane, 4,4′,4″-trimethyltriphenylmethane, 2,2′,2″-triethyltriphenylmethane, 4-tert-butyltriphenylmethane, 4,4′,4″-tri-tert-butyltriphenylmethane, 4,4′,4″-trichlorotriphenylmethane, tri-β-naphthylmethane, α,α,β-trinaphthylmethane, etc.

Various unsuccessful attempts have been made in the past to synthesize triarylcarbinols by the direct air oxidation of triarylmethanes. For example, in a study of the oxidation of tertiary hydrocarbons, Stephens and Roduta (JACS 57, p. 2380, 1935) subjected triphenylmethane to the action of gaseous oxygen at 119° for 21 days. Benzophenone and phenol were the only oxidation products obtained. Significantly, the authors state "triphenylcarbinol was searched for with negative results."

It is therefore surprising that triarylmethanes can be oxidized by the catalytic process of the present invention to triarylcarbinols without cleavage to diarylketones or formation of undesirable phenolic products.

In the practice of the present invention, it has been found that a catalyst system comprising in conjoint presence bromine and a heavy metal oxidation catalyst, and particularly when employed in a carboxylic acid solvent, is an extremely effective and efficient promoter of the oxidation of triarylmethanes to the corresponding triarylcarbinols. As metal oxidation catalysts may be employed polyvalent metals of the heavy metals shown in the "Periodic Chart of Elements" appearing on pages 56 and 57 of the "Handbook of Chemistry," 8th Edition, published by Handbook Publishers, Inc., Sandusky, Ohio (1952). Of the heavy metal group, polyvalent metals having an atomic number from 23 to 28 are particularly effective. Excellent results are obtained with a metal of the group consisting of manganese, cobalt, and mixtures thereof. The metal may be added in elemental form, as the oxide or hydroxide, or in the form of a metal salt. For example, the metal manganese may be employed as the salt of an aliphatic carboxylic acid such as manganese acetate, manganese oleate, and the like; as the salt of an aromatic or cycloaliphatic carboxylic acid, for example, manganese naphthenate, manganese toluate, etc.; in the form of an organic complex, such as the acetylacetonate, the 8-hydroxy-quinolate and the ethylene diamine tetraacetate, as well as inorganic manganese salts such as the borates, halides and nitrates which are also effective.

The bromine may be added in elemental, combined or ionic form. As a source of available bromine, ammonium bromide or other bromine-containing compounds soluble in the reaction medium may be employed. Satisfactory results have been obtained, for example with potassium bromate, potassium bromide, sodium bromide and the like. Organic bromine compounds e.g., tetrabromoethane, benzyl bromide, bromoform and the like may be employed if desired.

The amount of the metal catalyst employed is not critical and may be in the range of from about .01 to about 10% by weight or more based on the aromatic reactant charged. Such catalyst may comprise a single heavy metal or a mixture of two or more heavy metal oxidation catalysts. Where the heavy metal is introduced as a bromide salt, for example, as manganese bromide, the proportions of manganese and bromine will be in their stoichiometric proportions. The ratio of metal to bromine may be varied, for example, within the range from about 1 to 10 atoms of heavy metal oxidation catalyst per atom of bromine to about 1 to 10 atoms of bromine per atom of heavy metal.

The relation of temperature and pressure should be so regulated as to provide liquid phase in the reaction zone. Generally, the pressure may be in the range of atmospheric up to about 1500 p.s.i.g. The liquid phase may comprise all or a portion of the organic reactant or it may comprise a reaction medium in which the organic reaction is dissolved or suspended.

While a solvent need not be employed, in a preferred embodiment of the invention, the oxidation is conducted in the presence of a solvent medium comprising a monocarboxylic acid having from 2 to 8 carbon atoms in the molecule. Such acids which are free of hydrogen atoms attached to tertiary carbon atoms are particularly advantageous as solvent since they have been found to be relatively stable or inert to oxidation in the reaction system. Lower saturated aliphatic monocarboxylic acids having from 2 to 4 carbon atoms in the molecule are particularly effective solvents.

The preferred solvent is acetic acid usually employed in its glacial form. Although acetic acid is preferred, carboxylic acids such as propionic acid, butyric acid, caproic acid, benzoic acid and the like may be employed. Mixtures of these acids may be used. Where all the advantages of an acid medium are not required, other inert media may be used.

Those skilled in the art will appreciate that the amount of solvent employed will be varied over wide limits. The amount of solvent utilized is not critical but typically will be in the range of from about 0.1 to about 10, desirably 0.5 to 4 times the weight of oxidizable starting material.

As to the molecular oxygen containing gas, there may be employed substantially 100% oxygen gas or gaseous mixtures containing lower concentrations of oxygen, for example, air. Such mixtures preferably have oxygen contents within the range of about 5% by volume to about 20% or more by volume. As such mixtures there may be employed air or air which has been diluted with gases such as nitrogen, $CO_2$, and the like, or corresponding mixtures prepared from substantially pure gaseous oxygen and such inert diluents may be used.

The reaction temperature should be sufficiently high so that the desired oxidation reaction occurs and yet not so high as to cause undesirable charring or decomposition of the feedstock or oxidation products. Desirably, temperatures in the range of 50–275° C., preferably 150–250° C. are employed. We have found that in the oxidation of triphenylmethane temperatures of 250° C. or higher result in increased formation of benzophenone at the expense of the desired triphenylcarbinol product.

In order to facilitate a clear understanding of the invention, the following preferred specific embodiments are described detail.

*Example 1*

The process is conducted in an apparatus having in combination a corrosion resistant oxidation reactor and a water cooled condenser mounted above the reactor. The reaction section is wound with Nichrome ribbon to a height of about one-third the reactor height. When the oxidation is in progress, air under pressure is admitted to the reactor through a gas distributor located at the bottom of the reactor. Vent gases exit through a tube at the top of the condenser and pass through a needle control valve, a mercury-in-glass flow meter and a dry ice trap prior to venting to the atmosphere. The reactor is charged by adding weighed amounts of each reactant through the top of the condenser, which is then closed and the reactor pressure raised to about 400 p.s.i.g. with air. Thus, the reactor was charged with 45 g. (0.2 mole) triphenylmethane, 150 g. glacial acetic and a solution of 0.4 g. cobalt acetate, 0.8 g. manganese acetate and 0.4 g. ammonium bromide in 6 ml. of water. The pressure was set at 400 p.s.i.g. and the reaction section heated to 205° C., while air was passed through the reactor contents at the rate of 0.13 cubic feet per minute until a total of 14.5 cubic feet of air (S.T.P.) had been used. The reactor was then cooled, the contents removed, and the acetic acid evaporated off on a steam bath. The residue obtained weighed 46 g. and analyzed 80% by weight triphenylcarbinol, 10% benzophenone and 10% unreacted triphenylmethane.

*Example 2*

The oxidation procedure of Example 1 was repeated except that a temperature of about 260° C. was employed. A total of 19.0 cubic feet of air (S.T.P.) was used for the oxidation. The crude product recovered as before, weighed 43 g. and analyzed 70% by weight triphenylcarbinol, 30% benzophenone. Thus, it is seen that while elevated temperatures result in more complete oxidation of the triarylmethane feedstock, decreased yields of the desired triarylcarbinol are obtained.

Desirable or comparable results may be achieved by various modifications of the process described and exemplified above. The oxidation of triarylmethanes may, for example, be conducted in a continuous manner, the reaction being conducted so as to convert all or a portion of the triarylmethane feedstock to the corresponding triarylcarbinol. The reaction pressure may be varied in the range of atmospheric to about 1500 p.s.i.g., the pressure being sufficient to maintain all or a part of the organic reactant in the liquid phase. It will be recognized that time, temperature, catalyst concentration, solvent concentration and the like are interrelated variables and may be varied depending upon the particular feedstock employed. Lower temperatures may, for example be indicated where a more highly concentrated source of molecular oxygen is employed in lieu of air, for example, pure oxygen or mixtures of oxygen and inert gas containing 50% or more by volume of molecular oxygen.

The triarylcarbinols which are produced by the process of the invention are valuable as organic intermediates for the preparation of useful esters, ethers and other triarylmethane derivatives. Triphenylcarbinol has been used to inhibit sediment formation in fuel oils, as a stabilizer for high molecular weight halogen compounds and as a synergist in insecticidal formulations.

Numerous other advantages of the instant invention will be readily apparent to those skilled in the art and it is to be understood that changes and variations may be made therein without departing from the spirit and scope of the invention as defined in the appended claims.

We claim:

1. A process for the preparation of triarylcarbinols which comprises reacting a hydrocarbon selected from the group consisting of triarylmethane and alkyl substituted triarylmethane in the liquid phase with molecular oxygen at a temperature between about 150° C. and 250° C. in a saturated aliphatic monocarboxylic acid solvent having from 2 to 8 carbon atoms and in the presence of a catalyst consisting essentially of bromine and a heavy metal oxidation catalyst, wherein the heavy metal has an atomic number of 23 to 28 inclusive.

2. A process for the preparation of triarylcarbinols which comprises reacting a hydrocarbon selected from the group consisting of triarylmethane and alkyl substituted triarylmethane in the liquid phase with molecular oxygen at a temperature between about 150° C. and 250° C. in a saturated aliphatic monocarboxylic acid solvent having from 2 to 8 carbon atoms and in the presence of a catalyst consisting essentially of bromine and a mixture of manganese and cobalt salts.

3. A process for the preparation of triarylcarbinols which comprises reacting a hydrocarbon selected from the group consisting of triarylmethane and alkyl substituted triarylmethane in the liquid phase with molecular oxygen at a temperature between about 150° C. and 250° C. in a saturated aliphatic monocarboxylic acid solvent having from 2 to 8 carbon atoms wherein said solvent is employed in a ratio of from about 0.1 to 10 parts by weight per part of said class of triarylmethane hydrocarbons and in the presence of a catalyst consisting essentially of bromine and a heavy metal oxidation catalyst wherein the heavy metal has an atomic number of 23 to 28 inclusive.

4. A process for the preparation of triphenylcarbinol which comprises reacting triphenylmethane with molecular oxygen at a temperature between about 150° C. and about 250° C. in the liquid phase in acetic acid and in the presence of a catalyst consisting essentially of bromine and a mixture of manganese and cobalt salts.

References Cited in the file of this patent

FOREIGN PATENTS 492,448 Germany _____ Feb. 24, 1930